United States Patent
DeLuca et al.

(10) Patent No.: US 11,687,879 B2
(45) Date of Patent: Jun. 27, 2023

(54) PROVIDING DIGITAL TWIN ASSETS BASED OFF OF WORK ORDERS

(71) Applicant: International Business Machines Corporation, Armonk, NY (US)

(72) Inventors: Lisa Seacat DeLuca, Bozeman, MT (US); Jonathan Tristan O'Gorman, Cork (IE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/125,520

(22) Filed: Dec. 17, 2020

(65) Prior Publication Data

US 2022/0198390 A1    Jun. 23, 2022

(51) Int. Cl.

| | |
|---|---|
| G06Q 10/06 | (2023.01) |
| G06Q 10/0875 | (2023.01) |
| G06Q 10/0631 | (2023.01) |
| G06F 40/10 | (2020.01) |
| G06Q 30/0601 | (2023.01) |
| G06Q 30/0282 | (2023.01) |
| G06V 30/414 | (2022.01) |

(52) U.S. Cl.
CPC ......... G06Q 10/0875 (2013.01); G06F 40/10 (2020.01); G06Q 10/06315 (2013.01); G06Q 30/0282 (2013.01); G06Q 30/0629 (2013.01); G06V 30/414 (2022.01)

(58) Field of Classification Search
CPC .............. G06Q 10/0875; G06Q 10/20; G06F 16/3329; G06N 20/00; G05B 23/0283; H04L 67/12
See application file for complete search history.

(56) References Cited

U.S. PATENT DOCUMENTS 10,388,075 B2 * 8/2019 Schmirler ............... G06F 3/147
10,417,614 B2    9/2019 Johnson
(Continued)

FOREIGN PATENT DOCUMENTS

CN    109146090 A    1/2019
CN    209170419 U    7/2019

OTHER PUBLICATIONS

"Method and System of Implementing Cognitive Equipment Advisor", An IP.com Prior Art Database Technical Disclosure, Disclosed Anonymously, IP.com No. IPCOM000261646D, IP.com Electronic Publication Date: Mar. 24, 2020, 8 pages.
(Continued)

*Primary Examiner* — Florian M Zeender
*Assistant Examiner* — Milena Racic
(74) *Attorney, Agent, or Firm* — Randy Tejeda

(57) ABSTRACT

Disclosed are techniques for querying a digital twin marketplace for digital twins relevant to a work order and delivering said digital twins to a mobile computing device. A query for digital twins on a digital twin marketplace is generated using a workorder, followed by an availability assessment to determine the availability of the queried digital twins to a querying user. When a queried digital twin is available to the querying user, the queried digital twin is provided to a mobile computing device associated with the querying user. Querying and providing digital twins in this manner streamlines the determination and provision of digital twin assets to work order responders in-situ.

20 Claims, 6 Drawing Sheets

(56) References Cited

U.S. PATENT DOCUMENTS

| | | | |
|---|---|---|---|
| 10,564,993 B2 | 2/2020 | Deutsch | |
| 11,244,484 B2 * | 2/2022 | Dubey | G06F 30/27 |
| 11,288,308 B2 * | 3/2022 | Blackburn | G06Q 10/109 |
| 11,354,615 B2 * | 6/2022 | Berti | G06Q 10/20 |
| 2016/0247129 A1 * | 8/2016 | Song | G06Q 10/20 |
| 2017/0140580 A1 * | 5/2017 | Marr | G06Q 10/20 |
| 2017/0286572 A1 * | 10/2017 | Hershey | B64F 5/60 |
| 2018/0196409 A1 * | 7/2018 | Ben-Bassat | G06Q 10/06 |
| 2018/0203959 A1 * | 7/2018 | Refsnaes | G06F 30/23 |
| 2019/0158270 A1 | 5/2019 | Berti | |
| 2019/0287079 A1 | 9/2019 | Shiraishi | |
| 2020/0134639 A1 | 4/2020 | Martinez | |
| 2021/0158242 A1 * | 5/2021 | Berti | G06Q 10/06311 |
| 2021/0160961 A1 * | 5/2021 | DeLuca | H04W 84/18 |
| 2021/0287459 A1 * | 9/2021 | Celia | G07C 5/0808 |

OTHER PUBLICATIONS

Papacharalampopoulos, et al., "A Digital Twin for Automated Root-Cause Search of Production Alarms Based on KPIs Aggregated from IoT", Applied Sciences 2020, 10, 2377, 16 pages.

* cited by examiner

| Params● | Authorization | Headers (1) | Body● | Pre-request Script | Tests | Settings |
|---|---|---|---|---|---|---|
| Query Params ||||||||

| | KEY | VALUE |
|---|---|---|
| ✓ | manufacturer | Sandvick |
| ✓ | model | X1500 |
| ✓ | part | SB-159C |
| | Key | Value |

PROVIDING DIGITAL TWIN ASSETS BASED OFF OF WORK ORDERS

BACKGROUND

The present invention relates generally to the field of digital twins, and more particularly to providing relevant digital twins based on work orders.

A digital twin is a virtual representation of a physical object or system. Connected sensors on the physical object (i.e., asset) collect real-time data that is mapped to the virtual representation (i.e., model). The model uses the mapped data as input to output predictions or simulations of how the physical asset will be affected by the input. Digital twins integrate the Internet of Things (IoT), artificial intelligence (AI), machine learning (ML), and software analytics to generate the predictions and/or simulations. A digital twin marketplace (or exchange, store, etc.) connects the manufacturers of various physical assets (e.g., jet aircraft, mining equipment, railroad engines, etc.) and the owners/operators of said assets. Content available for purchase from the digital twin store includes, but is not limited to, parts lists, bills of material, user manuals, maintenance/service manuals, and augmented/virtual reality models.

A work order is often a task or a job performed on behalf of a customer that can be scheduled or assigned to someone. Such an order may be sourced from a customer request or generated internally within an organization. Work orders may also be generated as follow ups to inspections or audits of an asset. A work order may be for products or performance of services. A typical work order may include, but are not limited to, one or more of the following: (i) instructions; (ii) cost estimates; (iii) forms; (iv) date and time to execute the work order; (v) information about the location and entities/assets to execute the work order; and (vi) the person to whom the work order is assigned.

E-commerce (electronic commerce) refers to the activity of electronically purchasing or selling of products on online services or over the Internet. Electronic commerce relies upon technologies such as mobile commerce, electronic funds transfer, supply chain management, internet marketing, online transaction processing, electronic data interchange (EDI), inventory management systems, and automated data collection systems. E-commerce is in turn spurred by the technological improvements of the semiconductor industry and is the largest sector of the electronics industry. Modern electronic commerce typically leverages the World Wide Web for at least one part of the transaction's life cycle, although it may also use other technologies such as e-mail. Mobile commerce refers to delivering electronic commerce capabilities into the hands of consumers anywhere, at any time, through wireless communication technologies, such as into a smartphone device.

An online marketplace (also referred to as an online e-commerce marketplace or digital marketplace) is a type of e-commerce website where product or service information is provided by a plurality of third parties. Online marketplaces are the most common type of multichannel ecommerce and can be a method to streamline the production process.

SUMMARY

According to an aspect of the present invention, there is a method, computer program product and/or system that performs the following operations (not necessarily in the following order): (i) receiving a work order dataset, where the work order dataset includes a work order for a physical asset by a first user; (ii) querying a digital twin digital marketplace for digital twins corresponding to the physical asset based, at least in part, on the work order dataset; (iii) responsive to the query returning at least one digital twin corresponding to the physical asset, determining an availability assessment for the at least one digital twin, with the availability assessment corresponding to whether the at least one digital twin is available to the first user; and (iv) responsive to the availability assessment indicating that the at least one digital twin is available to the first user, providing, over a computer network, the at least one digital twin to a mobile computing device associated with the first user.

DETAILED DESCRIPTION

Figure 1:
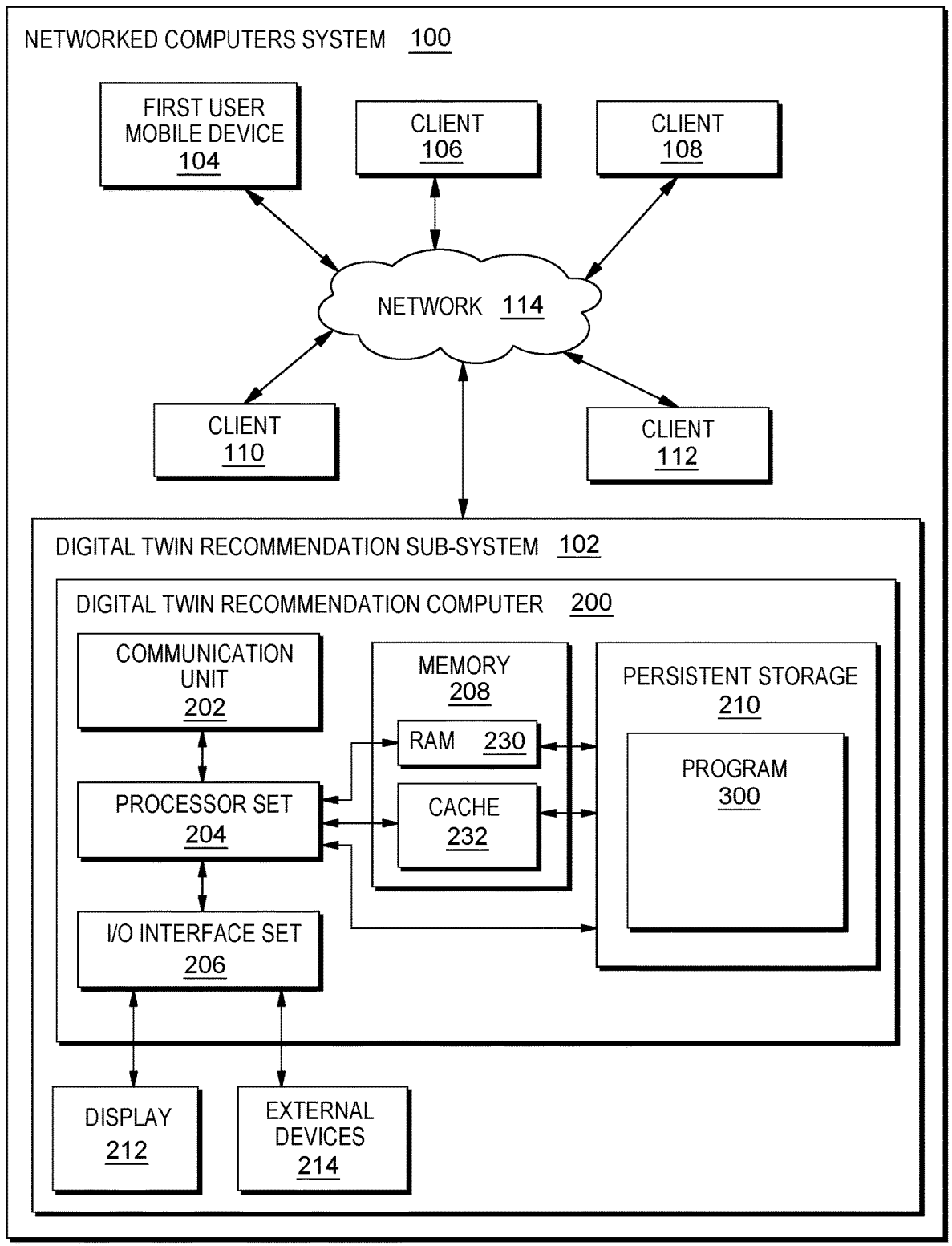
FIG. 1 is a block diagram view of a first embodiment of a system according to the present invention.

Some embodiments of the present invention are directed to techniques for querying a digital twin marketplace for digital twins relevant to a work order and delivering said digital twins to a mobile computing device. A query for digital twins on a digital twin marketplace is generated using a workorder, followed by an availability assessment to determine the availability of the queried digital twins to a querying user. When a queried digital twin is available to the querying user, the queried digital twin is provided to a mobile computing device associated with the querying user. Querying and providing digital twins in this manner streamlines the determination and provision of digital twin assets to work order responders in-situ.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium sometimes referred to as a machine readable storage device, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention.

Networked computers system 100 includes: server subsystem 102 (sometimes herein referred to, more simply, as subsystem 102); first user mobile device 104; client subsystems 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device(s) 214. External device(s) 214 will typically include devices such as a keyboard, keypad, a touch screen, and/or some other suitable input device. External device(s) 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
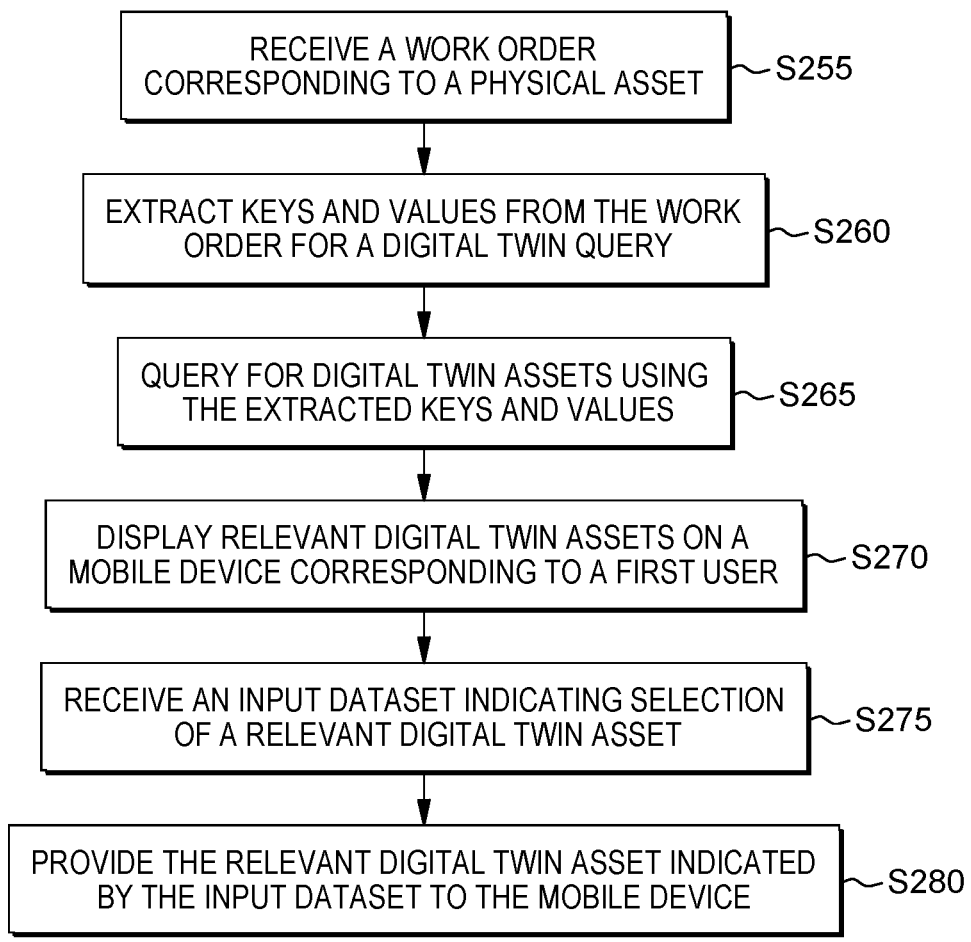
FIG. 2 is a flowchart showing a first embodiment method performed, at least in part, by the first embodiment system.
Figure 3:
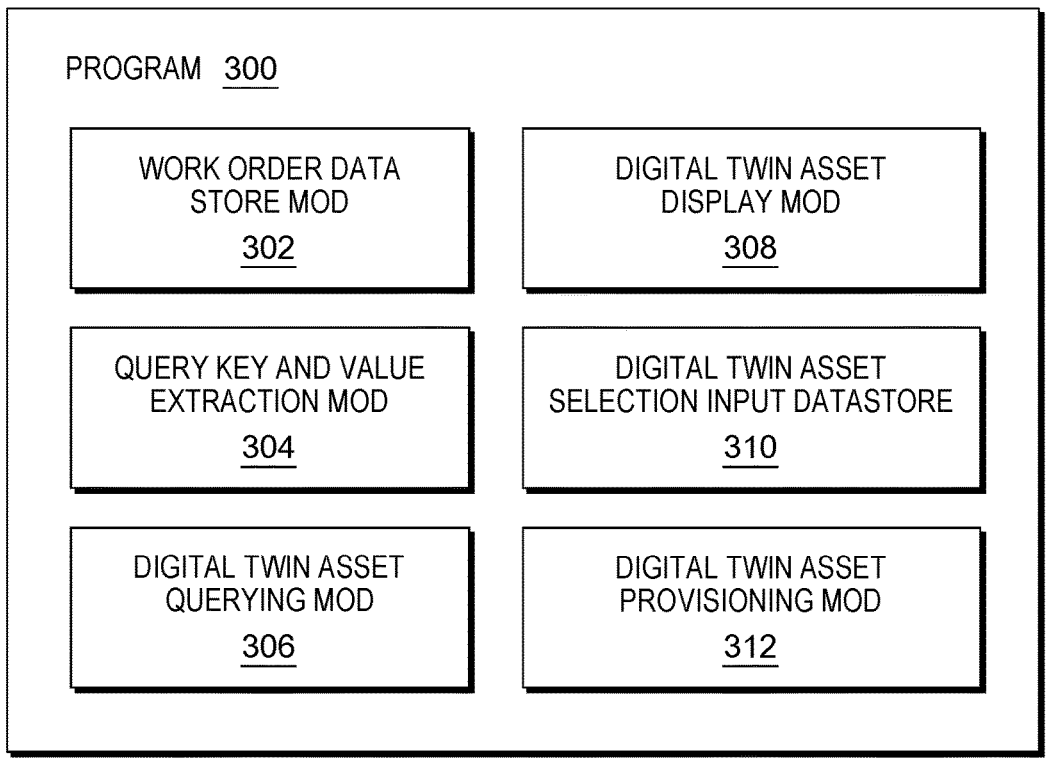
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where work order datastore module ("mod") 302 receives a work order corresponding to a physical asset. In this simplified embodiment, the physical asset is an ACME model ABC2 3D printer (sometimes referred to as "the Printer") located at a customer's factory, referred to as Example Moto-Shop (sometimes referred to as "the Factory"), which fabricates custom parts to facilitate bespoke customization of motorcycles. A work order was received by Bob's Printer Service Shop (sometimes referred to as "the Servicer") from a client computer associated with the Factory, such as client 112, when the Printer began printing components with materials that were not meeting quality standards set by the Factory. The work order reads: "Client Example Moto-Shop requesting service from servicer Bob's Printer Service Shop for their ACME ABC2 3D Printer, reporting that their printer is printing materials below quality standards." The Servicer elects to send a technician named John Doe (sometimes referred to as "the Technician") to diagnose the cause of this issue and enact repairs, and adds the following entry to the work order: "Bob's Printer Service Shop technician John Doe will diagnose the cause and repair the printer." In some alternative embodiments, work orders include a plurality of formatted fields and corresponding values, simplifying some of the natural language processing burdens described below.

Processing proceeds to operation S260, where query key and value extraction mod 304 extracts keys and values from the work order for a digital twin query. In this simplified embodiment, query key and value extraction mod 304 applies natural language processing to the information present in the work order received at S255 to extract the keys and their corresponding values, forming extracted key-value pairs. The work order, with the additional information provided by the Servicer, now reads: "Client Example Moto-Shop requesting service for their ACME ABC2 3D Printer, reporting that their printer is printing materials below quality standards. Technician John Doe will diagnose the cause and repair the printer." Using natural language processing techniques, query key and value extraction mod 304 extracts the following keys: (i) "client"; (ii) "asset"; (iii) "asset manufacturer"; (iv) "servicer"; (v) "technician"; (vi) "tasks". Additionally, the following values associated with the previous keys are extracted through similar techniques: (i) "Example Moto-Shop"; (ii) "ABC2 3D Printer"; (iii) "ACME"; (iv) "Bob's Printer Service Shop"; (v) "John Doe"; and (vi) "Diagnose cause and repair". In some alternative embodiments, the work order includes different information leading to different keys and corresponding values. In further alternative embodiments, using a work order with specified fields defined by headers and corresponding values, those values are automatically extracted along with the field headers to extract the key-value pairs.

Processing proceeds to operation S265, where digital twin asset querying mod 306 queries for digital twin assets using the extracted keys and values. In this simplified embodiment, digital twin asset querying mod 306 first compares the extracted keys with a predetermined list of acceptable keys for digital twin queries, to eliminate keys that are not relevant for querying digital twins on a digital marketplace. Keys eliminated in this manner include: (i) client; (iv) servicer; (v) technician; and (vi) tasks. The remaining keys and their corresponding values are automatically inputted into a digital marketplace, Example Digital Twin Marketplace, for digital twin assets to query for relevant digital twin assets. These keys and their corresponding values are: (i) "asset=ABC2 3D Printer"; and (ii) "manufacturer=ACME". Querying Example Digital Twin Marketplace using the above keys and their corresponding values, five digital twin assets are returned: (i) Schematic Drawings [of the ACME ABC2 3D Printer]; (ii) Fault Codes [for the ACME ABC2 3D Printer]; (iii) a Parts List [for the ACME ABC2 3D Printer]; (iv) a manufacturer's suggested Service Schedule [for the ACME ABC2 3D Printer]; and (v) a set of Historical Operation Logs [of the ACME ABC2 3D Printer]. In some alternative embodiments, digital twin asset querying mod 306 also applies natural language processing techniques to compare the queried digital twin assets with key-value pairs that indicate a purpose or tasks for the work order to determine suggested digital twin assets that are most likely to be helpful in completing the work order.

Figure 4:
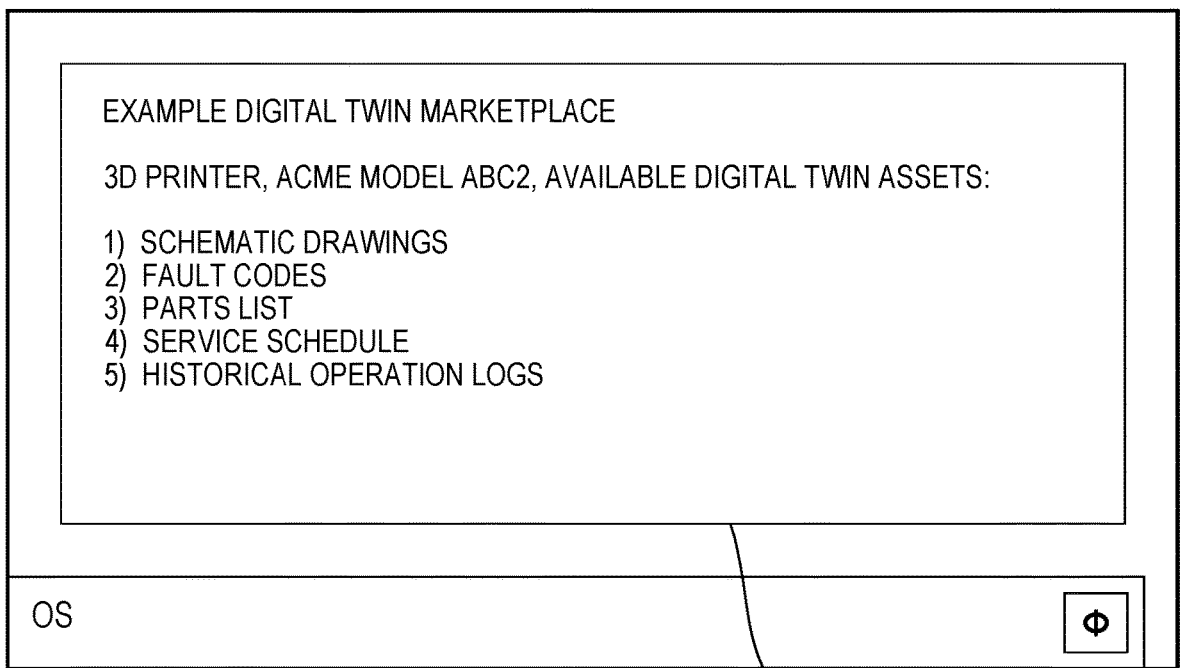
FIG. 4 is a screenshot view generated by the first embodiment system.

Processing proceeds to operation S270, where digital twin asset display mod 308 displays relevant digital twin assets on a mobile computing device associated with a first user. In this simplified embodiment, using the key-value pairs indicating the technician as John Doe and the servicer as Bob's Printer Service Shop, digital twin asset display mod 308 analyzes a dataset of mobile computer devices associated with Bob's Printer Service Shop, which includes first user mobile device 104 as well as clients 106, 108, and 110, to determine which mobile computer device is associated with John Doe in order to display the relevant digital twin assets. Upon identifying first user mobile device 104 as corresponding to John Doe, the digital twin assets are displayed as in window 402 of screenshot 400 of FIG. 4 on a display (not shown) connected to first user mobile device 104.

Processing proceeds to operation S275, where digital twin asset selection input datastore 310 receives an input dataset indicating selection of a relevant digital twin asset. In this simplified embodiment, John Doe provides touchscreen input through first user mobile device 104 to indicate selection of (i) Schematic Drawings and (iii) Parts List. In some alternative embodiments, the input dataset may be a natural language processed voice recording. For example, applying natural language processing to a recording of a human person saying: "Fault Codes."

Processing proceeds to operation S280, where digital twin asset provisioning mod 312 provides the relevant digital twin asset indicated by the input dataset to the mobile device. In this simplified embodiment, digital twin asset provisioning mod 312, using the input received at S275, transmits, over network 114, the Schematic Drawings and Parts List for the ACME ABC2 3D Printer digital twin to first user mobile device 104. John Doe is now able to reference the Schematic Drawings and Parts List on first user mobile device 104 while completing the work order. In some alternative embodiments, the first user completes the work order using the provided relevant digital twin asset. The relevant digital twin asset provides information on how the physical asset corresponding to the work order operates or is assembled, such as schematic information or fault codes to assist in diagnosing specific causes of issues that triggered the work order.

III. Further Comments and/or Embodiments

Some embodiments of the present invention recognize the following facts, potential problems and/or potential areas for improvement with respect to the current state of the art: (i) a digital twin exchange allows manufacturers such as original equipment manufacturers (OEM's) to provide digital resources to owners and operators of their assets; (ii) these digital resources help companies more intelligently operate their business; (iii) however, often times these owners and operators aren't aware of digital resources existing even if their company had already purchased those digital twin resources; (iv) a field technician might not be aware that they could get access to that data; and (v) what is needed is a way to bring the digital twin resources to these people in a frictionless manner.

Some embodiments of the present invention may include one, or more, of the following operations, features, characteristics and/or advantages: (i) filter digital twin resources within a content store or marketplace based on the digital twin resource's relevance to work item details; (ii) a next-generation mobile application platform that integrates capabilities from an asset management platform's solutions (such as IBM® Maximo® Anywhere), providing a single vendor product for improving productivity in the field; (iii) using such a mobile application platform as a mobile appa, mobile workers can work online and offline; (iv) when the worker is online, the app is connected to the server, and data is synchronized in real time; (v) when the worker is offline, the app is disconnected from the server but remains operational; (vi) the worker can continue to work with secure data collections that are stored on the device; (vii) data is synchronized when connectivity is restored; (viii) further enhance the existing mobile application while taking advantage of the sensors within a mobile device to surface relevant digital twin resources based on work orders or location of the technicians as described; (ix) sorting purchased digital twin resources in a catalog or mobile view; (x) retrieving a digital twin resource from a content source [digital marketplace] based on a work request; (xi) form an availability assessment; (xii) indicating a relevance of the first selected digital twin to the work request; and (xiii) providing an option to facility purchasing the second digital twin to the user Some embodiments of the present invention may include one, or more, of the following operations, features, characteristics and/or advantages: (i) a digital twin is created as a digital representation of a physical asset, equipment, building, or vehicle; (ii) a digital twin content store (ex. IBM Digital Twin Exchange) holds the resources that make up the digital twin; and (iii) some examples of such resources may include but are not limited to: (a) manuals, (b) bill of material, (c) parts, (d) manufacture date or age, (e) modernization/refurbishment date, (f) manufacturing warranty notifications, (g) warranty claims, (h) insurance claims, (i) insurer, (j) insurance policy, (k) maintenance plans, (l) maintenance history, (m) inspection history, (n) specifications (including specification to 3$d$ print a part), (o) 3D model/computer assisted drafting (CAD) drawings, (p) engineering change history, (q) fault codes, (r) scheduled maintenance plans, (s) operating manuals, (t) sensor data, (u) operating history, (v) predictive operating model (using artificial intelligence (AI) and other techniques), (w) identity of present owner, and (x) change in ownership.

Some embodiments of the present invention may include one, or more, of the following operations, features, characteristics and/or advantages: (i) work orders are created (for example, in IBM Maximo) that are related to a physical asset that has one or more digital twin resources; (ii) the work order is visible to: (a) one or more field technicians, (b) back office employees such as work planners, asset managers, supervisors, (c) individuals that are part of an organization that owns the physical asset, (d) company who is dispatching or contracting our support for the asset; (iii) a person who the work order is visible to chooses one or more work orders to work on; (iv) upon loading the details of the work order, a lookup is executed to compare the available digital twins on a 3rd party marketplace (ex. IBM Digital Twin Exchange) with the assets associated with the work order; (v) if no match is found, display the digital twins just as they would normally; (vi) if a match is found, and if the resource was purchased by the company: (a) display a link to the one or more digital twin resources, and (b) display evidence for why the digital twin resource may be relevant to the work order; (vii) if a match is found, but the resource was not purchased by the company: (a) provide a link to the digital twin for purchase requisition/order from within the work order with evidence for my it may be relevant to perform the job, (b) optionally, the digital twins available could be sorted based on the role of the individual viewing, (c) for example, filtering and/or make recommendations using a technician's characteristics, (d) an apprentice might not be the best person to decide whether to buy a given resource, but the team lead would be, (e) likewise, the sensor data might be more interesting to an inspector than a mechanic, or the predictive model is more interesting to the reliability engineer than it would be to the electrician.

Figure 5:
FIG. 5 is a first screenshot view generated by a second embodiment system according to the present invention.
Figure 6:
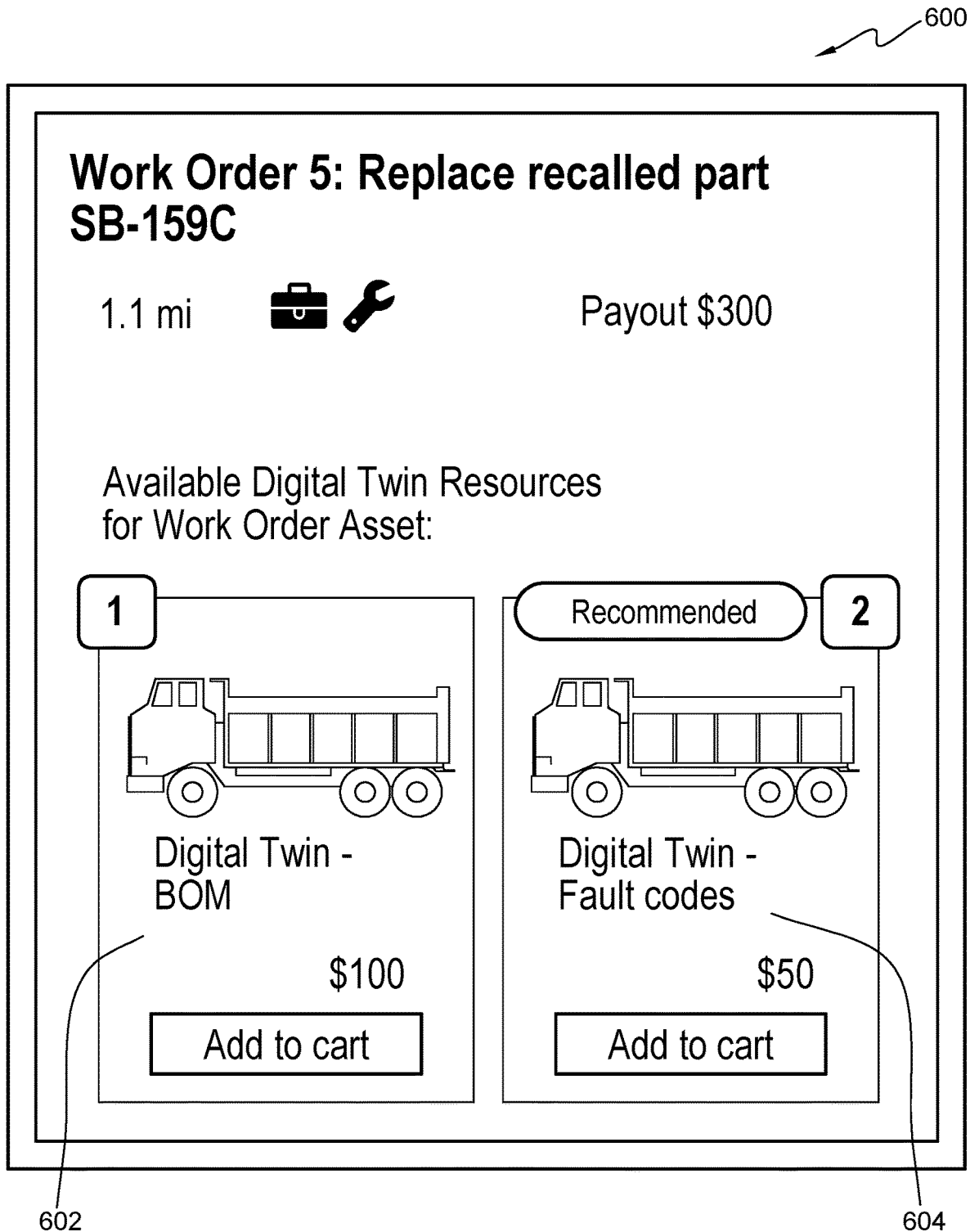
FIG. 6 is a second screenshot view generated by the second embodiment system.
Figure 7:
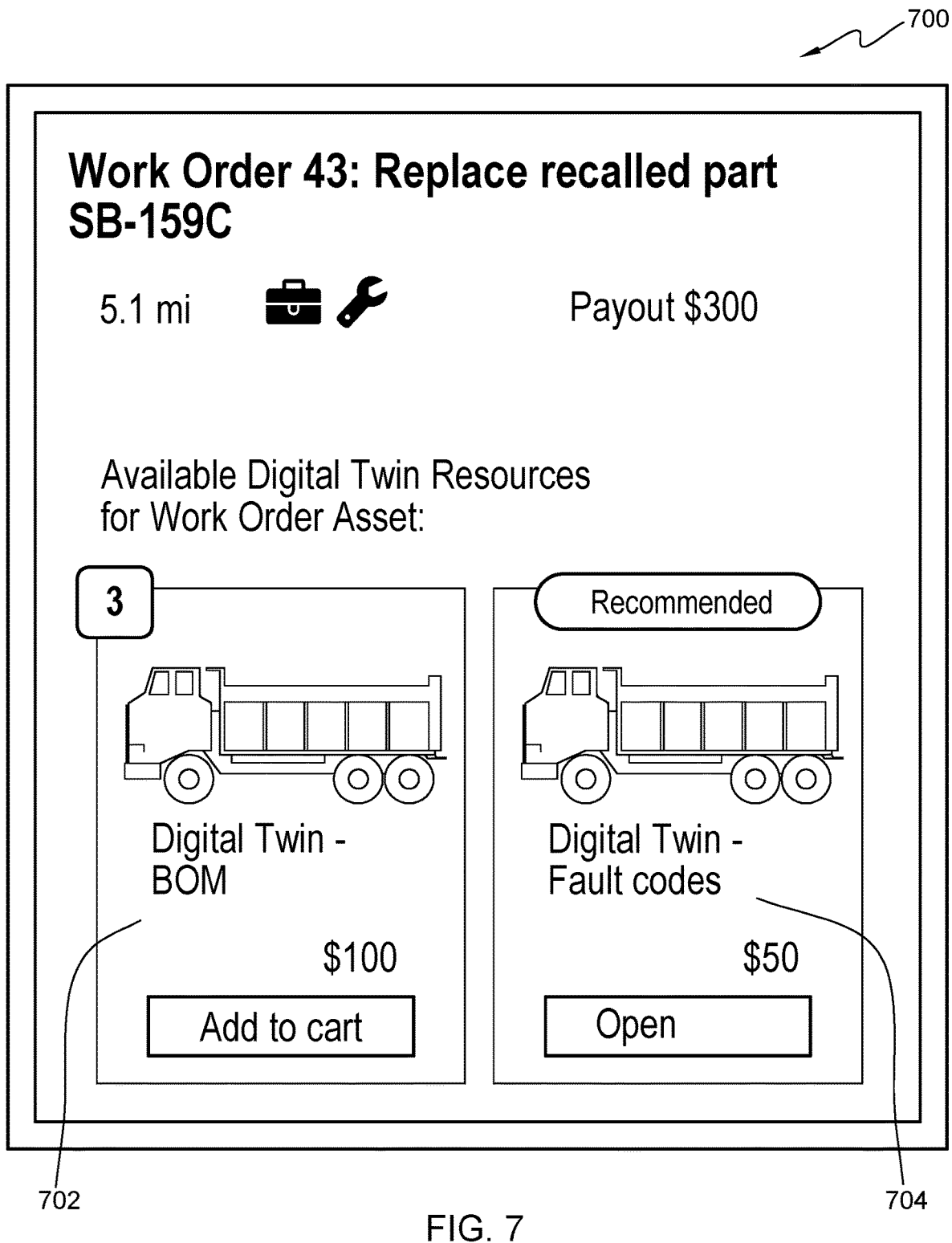
FIG. 7 is a third screenshot view generated by the second embodiment system.

An example based upon a second embodiment of the present invention will now be discussed with reference to FIGS. 5, 6 and 7. In this example, E1 is a technician who works for an underground mining company. He heads out to a job site to perform a work order. When he pulls up his mobile application, he'll see a list of all the work orders he's assigned to. Work order 5 is for repairing a broken down truck. The system compares the truck that he'll be working on with the available digital twins on the IBM Digital Twin Exchange, using keys and corresponding values from the work order, as shown in screenshot 500 of FIG. 5, and finds a match. There are two available digital twins, as shown in screenshot 600 of FIG. 6. One is for a bill of materials (1), bill of materials 602. Another for some failure codes (2), fault codes 604. The failure code (2) is recommended because he'll likely need to determine the reason why the truck might have broken down and the type of remedial work he'll need to perform. For example, on the work order, typically there is a failure code which indicates why the asset is broken down. With this data, the technician can infer the likely problem and cause, and select the appropriate remedy. If the failure code is missing, and the work order is a corrective work order (indicated by work type on the work order), it can be inferred that a failure/fault code is not available and likely beneficial. He purchases the second digital twin and from his mobile device he can pull up the failure code hierarchy. From the list of problems, he selects "Unable to start truck"; from the list of causes, he is able to determine and specify "Severed fuel line"; and for remedy he can indicate "Replace fuel line". The next time he has to perform a repair on a similar asset, the work order does a similar lookup and sees that the digital twin has already been purchased (3), as shown in screenshot 700 of FIG. 7, where bill of materials 702 still shows "Add to card" while fault codes 704 shows "open" indicating that it was previously purchased.

According to a third embodiment of the present invention, there is a method for retrieving a digital twin resource from a content source [digital marketplace] based on a work request comprising: (i) receiving the work request to work on an asset by a user; (ii) associating the asset with one or more digital twins pertaining to the work request available on the content source [digital marketplace]; (iii) determining if the one or more digital twins are available to the user [previously purchased by the user or an employer of the user] to form an availability assessment as one of available and not available; and (iv) responsive to determining a first selected digital twins is available, providing the first selected digital twin to the user. The method according to the third embodiment, further comprising: indicating a relevance of the first selected digital twin to the work request. The method according to the third embodiment, further comprising: responsive to determining a second selected digital twins is not available, providing an option to facility purchasing the second digital twin to the user. The method according to the third embodiment, further comprising: considering characteristics of the user in selecting digital assets related to the work request.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

What is claimed is:

1. A computer-implemented method (CIM) comprising:
receiving a work order dataset, where the work order dataset includes a work order for a physical asset by a first user;
extracting, from the work order dataset, using natural language processing, a keyword dataset corresponding to a set of key-value pairs indicative of a plurality of attribute values respectively corresponding to a plurality of attributes of the work order, including at least the following attribute types: physical asset name, and tasks to complete the work order;
querying a digital twin digital marketplace for digital twins corresponding to the physical asset based, at least in part, on the extracted keyword dataset, excluding keys from the key-value pairs that correspond to keys which are absent from a list of acceptable keys for digital twin queries;
responsive to the query returning at least one digital twin corresponding to the physical asset, determining an availability assessment for the at least one digital twin, with the availability assessment corresponding to whether the at least one digital twin is available to the first user;
responsive to more than one returned digital twin, filtering the more than one returned digital twin based on technical characteristics of the first user; and
responsive to the availability assessment indicating that the at least one digital twin is available to the first user, providing, over a computer network, the at least one digital twin and an indication of relevance to a mobile computing device associated with the first user while utilizing sensors within the mobile device to surface resources of the at least one digital twin based on a location of the first user, wherein the indication of relevance is a link to an associated purchase requisition.

2. The CIM of claim 1, further comprising:
determining, from the at least one digital twin returned from the query, a subset of recommended digital twin assets based, at least in part, on information in the work order dataset.

3. The CIM of claim 2, further comprising:
displaying, on the mobile computing device associated with the first user, information indicative of the subset of recommended digital twin assets as recommended to complete the work order.

4. The CIM of claim 3, wherein the subset of recommended digital twin assets is determined using natural language processing on the work order and the at least one digital twin returned from the query.

5. The CIM of claim 4, wherein the determination of the subset of recommended digital twin assets is based, at least in part, on natural language processing information in the work order dataset indicative of tasks to be performed to complete the work order.

6. The CIM of claim 4 wherein the determination of the subset of recommended digital twin assets is based, at least in part, on natural language processing information in the work order dataset indicative of characteristics corresponding to the first user.

7. The CIM of claim 6, wherein the characteristics include at least information indicative of what role is associated with the first user corresponding to their contribution to completion of the work order.

8. A computer program product (CPP) comprising:
a machine readable storage device; and
computer code stored on the machine readable storage device, with the computer code including instructions for causing a processor(s) set to perform operations including the following:
receiving a work order dataset, where the work order dataset includes a work order for a physical asset by a first user;
extracting, from the work order dataset, using natural language processing, a keyword dataset corresponding to a set of key-value pairs indicative of a plurality of attribute values respectively corresponding to a plurality of attributes of the work order, including at least the following attribute types: physical asset name, and tasks to complete the work order;
querying a digital twin digital marketplace for digital twins corresponding to the physical asset based, at least in part, on the extracted keyword dataset, excluding keys from the key-value pairs that correspond to keys which are absent from a list of acceptable keys for digital twin queries;
responsive to the query returning at least one digital twin corresponding to the physical asset, determining an availability assessment for the at least one digital twin, with the availability assessment corresponding to whether the at least one digital twin is available to the first user;
responsive to more than one returned digital twin, filtering the more than one returned digital twin based on technical characteristics of the first user; and
responsive to the availability assessment indicating that the at least one digital twin is available to the first user, providing, over a computer network, the at least one digital twin and an indication of relevance to a mobile computing device associated with the first user while utilizing sensors within the mobile device to surface resources of the at least one digital twin based on a location of the first user, wherein the indication of relevance is a link to an associated purchase requisition.

9. The CPP of claim 8, wherein the computer code further includes instructions for causing the processor(s) set to perform the following operations:
determining, from the at least one digital twin returned from the query, a subset of recommended digital twin assets based, at least in part, on information in the work order dataset.

10. The CPP of claim 9, wherein the computer code further includes instructions for causing the processor(s) set to perform the following operations:
displaying, on the mobile computing device associated with the first user, information indicative of the subset of recommended digital twin assets as recommended to complete the work order.

11. The CPP of claim 10, wherein the subset of recommended digital twin assets is determined using natural language processing on the work order and the at least one digital twin returned from the query.

12. The CPP of claim 11, wherein the determination of the subset of recommended digital twin assets is based, at least in part, on natural language processing information in the work order dataset indicative of tasks to be performed to complete the work order.

13. The CPP of claim 11, wherein the determination of the subset of recommended digital twin assets is based, at least in part, on natural language processing information in the work order dataset indicative of characteristics corresponding to the first user.

14. The CPP of claim 13, wherein the characteristics include at least information indicative of what role is associated with the first user corresponding to their contribution to completion of the work order.

15. A computer system (CS) comprising:
a processor(s) set;
a machine readable storage device; and
computer code stored on the machine readable storage device, with the computer code including instructions for causing the processor(s) set to perform operations including the following:
receiving a work order dataset, where the work order dataset includes a work order for a physical asset by a first user;
extracting, from the work order dataset, using natural language processing, a keyword dataset corresponding to a set of key-value pairs indicative of a plurality of attribute values respectively corresponding to a plurality of attributes of the work order, including at least the following attribute types: physical asset name, and tasks to complete the work order;
querying a digital twin digital marketplace for digital twins corresponding to the physical asset based, at least in part, on the extracted keyword dataset, excluding keys from the key-value pairs that correspond to keys which are absent from a list of acceptable keys for digital twin queries;
responsive to the query returning at least one digital twin corresponding to the physical asset, determining an availability assessment for the at least one digital twin, with the availability assessment corresponding to whether the at least one digital twin is available to the first user and;
responsive to more than one returned digital twin, filtering the more than one returned digital twin based on technical characteristics of the first user; and
responsive to the availability assessment indicating that the at least one digital twin is available to the first user, providing, over a computer network, the at least one digital twin and an indication of relevance to a mobile computing device associated with the first user while utilizing sensors within the mobile device to surface resources of the at least one digital twin based on a location of the first user, wherein the indication of relevance is a link to an associated purchase requisition.

16. The CS of claim 15, wherein the computer code further includes instructions for causing the processor(s) set to perform the following operations:
determining, from the at least one digital twin returned from the query, a subset of recommended digital twin assets based, at least in part, on information in the work order dataset.

17. The CS of claim 16, wherein the computer code further includes instructions for causing the processor(s) set to perform the following operations:

displaying, on the mobile computing device associated with the first user, information indicative of the subset of recommended digital twin assets as recommended to complete the work order.

18. The CS of claim 17, wherein the subset of recommended digital twin assets is determined using natural language processing on the work order and the at least one digital twin returned from the query.

19. The CS of claim 18, wherein the determination of the subset of recommended digital twin assets is based, at least in part, on natural language processing information in the work order dataset indicative of tasks to be performed to complete the work order.

20. The CS of claim 18, wherein:
the determination of the subset of recommended digital twin assets is based, at least in part, on natural language processing information in the work order dataset indicative of characteristics corresponding to the first user; and
the characteristics include at least information indicative of what role is associated with the first user corresponding to their contribution to completion of the work order.

* * * * *